M. L. BALLARD.
Carriage Spring Coupling.
No. 201,381. Patented March 19, 1878.
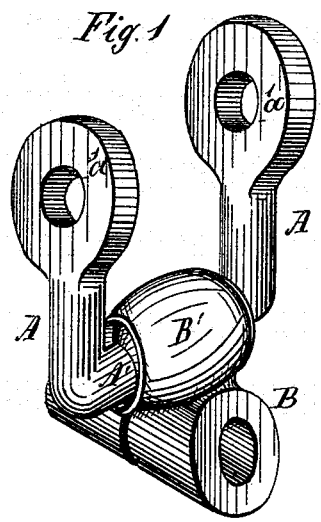
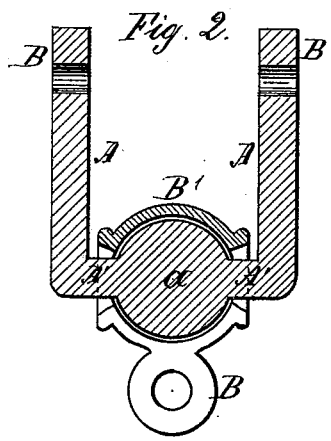
Witnesses
Henry Orth
H. H. Bliss
Inventor:
Martin L. Ballard
fr Abbott & Co
atty

UNITED STATES PATENT OFFICE.

MARTIN L. BALLARD, OF CANTON, OHIO, ASSIGNOR TO HATTIE W. BALLARD, OF SAME PLACE.

IMPROVEMENT IN CARRIAGE-SPRING COUPLINGS.

Specification forming part of Letters Patent No. 201,381, dated March 19, 1878; application filed February 11, 1878.

*To all whom it may concern:*

Be it known that I, MARTIN L. BALLARD, of Canton, in the county of Stark and State of Ohio, have invented certain new and useful Improvements in Couplings for Carriage-Springs; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The invention relates to a novel construction of hangers or couplings which are employed for uniting the ends of that class of carriage or wagon springs commonly known as "platform-springs;" and consists, essentially, in connecting the upper and lower portions of the coupling by means of a ball-and-socket joint, whereby great freedom of movement without cramping of parts is permitted.

Figure 1 is a perspective view of my invention, and Fig. 2 is a vertical section taken on a line through the bar or link which carries the ball part of the coupling.

A A represent the legs, and A' the bar, of the stirrup part. *a* is the ball formed centrally upon the bar A'. The legs A A are expanded at their ends to form ears *a' a'*, through which a bolt passes. B B are ears upon each end of a socket-strap, B', which incloses and fits loosely upon the ball *a*, substantially as shown.

The stirrup part A A A', provided with the ball *a*, may be cast first, and the socket-piece may then be cast upon it, the ball being cast in a chill, and the inside of the socket being chilled by being cast upon the ball; or the two parts may be cast separately and then rendered malleable.

In the latter case the socket-piece may be cast with the ears spread apart sufficiently to permit this part (after it has been malleated) to be passed over the ball *a*, when the socket can be bent or swaged to its place. (Shown in the drawings.)

From an examination of the drawings it will be readily seen that my construction permits a free lateral motion of this socket-piece upon the ball in addition to its vibratory rotating movement, and that therefore there is much less liability of straining or cramping of this coupling than there is in one of those commonly employed.

What I claim is—

The herein-described carriage-spring coupling, having its two parts united by means of a ball-and-socket joint, substantially as set forth.

In testimony that I claim the foregoing as my own I affix my signature in presence of two witnesses.

MARTIN L. BALLARD.

Witnesses:
 JOSEPH FREASE,
 FRANK E. CASE.